United States Patent [19]

Carlisle

[11] Patent Number: 4,507,199

[45] Date of Patent: Mar. 26, 1985

[54] OIL FILTER UNIT AND SEALING DEVICE

[76] Inventor: Robert W. Carlisle, 26216 Parana, Houston, Tex. 77080

[21] Appl. No.: 488,989

[22] Filed: Apr. 27, 1983

[51] Int. Cl.³ .............................................. B01D 27/00
[52] U.S. Cl. .................................. 210/238; 210/248; 210/DIG. 17
[58] Field of Search ....... 210/232, 238, 248, DIG. 17, 210/541, 168, 542, 416.4; 220/288, 85 H, 411, DIG. 5; 215/12 R, 100.5; 123/196 A, 198 R; 141/86, 88, 207; 222/108

[56] References Cited

U.S. PATENT DOCUMENTS

| | | | |
|---|---|---|---|
| 2,766,068 | 10/1956 | Roissard | 220/288 |
| 3,473,666 | 10/1969 | Humbert, Jr. | 210/232 |
| 4,091,955 | 5/1978 | Sloan, Sr. | 220/288 |
| 4,376,703 | 3/1983 | Krauss | 222/108 |
| 4,451,368 | 5/1984 | Pandelana | 210/238 |

*Primary Examiner*—Richard V. Fisher
*Assistant Examiner*—Wanda Millard
*Attorney, Agent, or Firm*—Bernard A. Reiter

[57] ABSTRACT

An oil filter sealing device adapted to seal and protect the oil circulation apertures and reinforcing plate of an oil filter unit, said sealing device comprising, as a unitary structure:

(a) a flat, circular plate having an upper surface and a lower surface; and
(b) a frictional attachment means centrally disposed on the lower surface of said flat, circular plate.

4 Claims, 2 Drawing Figures

OIL FILTER UNIT AND SEALING DEVICE

BACKGROUND OF THE INVENTION

This invention relates to an oil filter sealing device. More particularly, the present invention relates to an oil filter sealing device useful in the prevention of personal and fire safety hazards brought about when oil seeps from a used oil filter which has been removed from an oil circulation system and discarded.

Further, the present invention relates to an oil filter sealing device which, in certain instances, may be combined with a used oil filter to provide an excellent oil sample container useful in the shipping of samples for oil analysis, a proven method for the non-destructive testing of engine performance, particularly in aircraft maintenance.

Still further, this invention relates to an oil filter sealing device which would simplify manufacturer's packaging requirements, provide inexpensive, yet excellent, protection for the seal and reinforcing plate of a new filter, and guarantee customer receipt of an uncontaminated product.

In view of the foregoing, it is the primary object of the present invention to provide a novel type of oil filter sealing device which would serve to achieve these advantages.

These and other objects of the present invention will be best understood upon a reading of the following detailed description taken in connection with the accompanying drawings which form part of the specification, with the understanding, however, that the invention is not confined to a strict conformity with the drawings but may be changed or modified so long as such changes or modifications constitute no material departure from the salient features of the invention as expressed in the appended claims.

DESCRIPTION OF THE PREFERRED EMBODIMENTS

Figure 1:
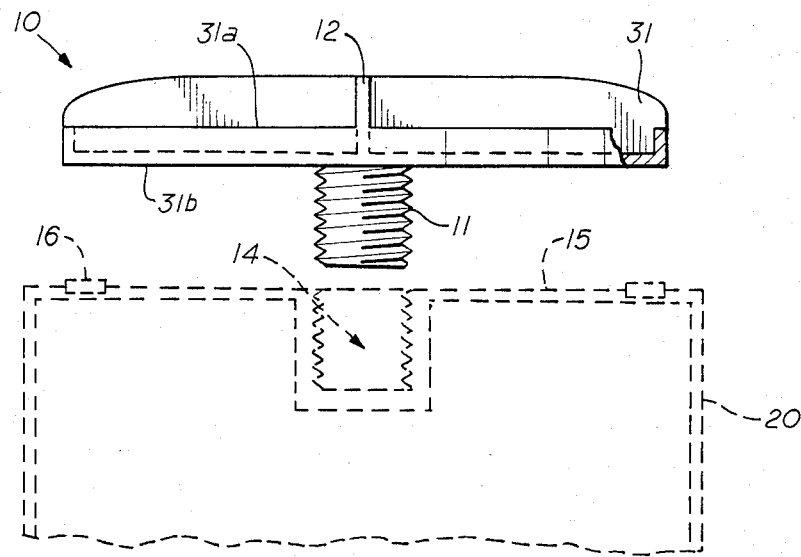
FIG. 1 is an illustration of the application of the present invention to the body of an oil filter unit.

As illustrated in FIG. 1, the oil filter sealing device 10 of the present disclosure and an oil filter unit 20 are shown in a disengaged position. Such illustration is useful in depicting the use of the present oil filter sealing device and is shown for purposes of convenience in understanding the operation and function of the invention herein disclosed.

The oil filter unit 20 generally designates a portion of an oil filter unit of a form or construction employed in certain oil lubrication systems.

The oil passage 14 forms the central portion of the oil filter unit 20, and may be internally threaded for appropriate engagement with a support connected to an oil lubrication system. The oil filter unit also comprises a reinforcing plate 15 having a plurality of oil circulation apertures 17 disposed therethrough. Affixed to the circumference of the plate is a rubber gasket 16. This gasket serves to provide added protection against possible oil seepage when the oil filter unit is appropriately engaged with the oil lubrication system.

The oil filter sealing device 10 may be generally described as a flat, circular plate 31 having an upper surface 31a and a lower surface 31b. The upper surface 31a may be essentially convex in configuration in that it tapers near its periphery. The upper surface 31a is reinforced by a plurality of cross ridges 12. These ridges also serve as handles to facilitate turning of the device 10. The lower surface 31b of the oil filter sealing device 10 is preferably flat and has a centrally disposed attachment means 11 shown for exemplary purposes with threads and adapted for engagement with the recess 14 shown also with mating threads for exemplary purposes. It will also be recognized that the attachment means 11 may be envisioned in the form of a male and female receptacle functionally engaging one another.

To engage the oil filter sealing device 10 with the oil filter unit 20, the screw-threaded attachment means 11 is inserted into the screw-threaded recess 14 and is then turned clockwise until the lower surface 31b of the filter sealing unit is tightened firmly against the gasket 16 that rests on end plate 15.

The oil filter sealing device 10 disclosed herein may be constructed in various sizes, but it is preferably designed such that its circumference approximates the circumference of the rubber gasket 16 which defines the outer perimeter of the end plate 15 of the oil filter unit 20.

Figure 2:
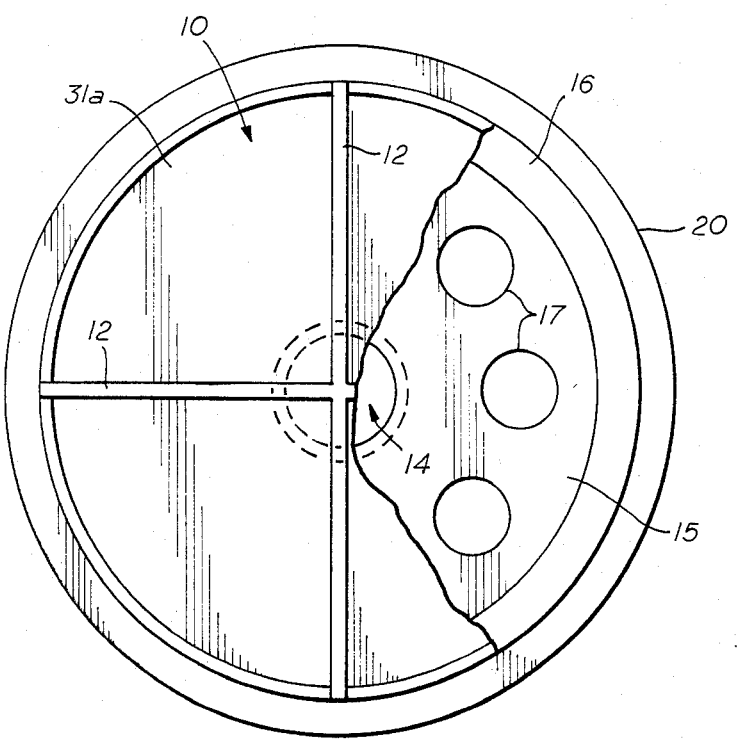
FIG. 2 is a top view of the present invention showing a portion of the oil filter sealing device broken away to show a part of the underlying oil filter unit.

In FIG. 2, the oil filter sealing device 10 and oil filter unit 20 are shown in an assembled position with a portion of the oil filter sealing device broken away to show the outer periphery of the oil filter unit 20, the central oil passage 14, the reinforcing plate 15, and a plurality of oil circulation apertures 17 disposed appropriately on the reinforcing plate.

The oil filter sealing device herein revealed is preferably injection molded as a unitary structure, and may be made of a suitably sturdy, oil resistant material, such as plastic, so that the sealing device will not warp or become deformed as it is tightened into position.

It is to be understood that the present invention is not to be taken as being limited to the accompanying drawings and specifications. While a particular embodiment of the present invention has been herein illustrated and described, it is not intended to limit the invention to such disclosure, but changes and modifications may be made therein and thereto.

It is also to be understood that the phraseology and terminology herein employed are for purposes of description and not of limitation, since the scope of the present invention is denoted by the appended claims.

What is claimed is:

1. A throw away protective cap in combination with a screw-on type oil filter unit including a generally cylindrical housing having first and second ends and wherein said first end is characterized by means defining an oil passage, said oil passage including threaded means therein for threadably receiving the throw away protective cap, said cap comprising:
   a flat plate like member having an upper surface and a lower surface;
   said upper surface characterized by means for facilitating the application of force thereon for inducing manual rotation of said cap;
   said lower surface of said cap constituting a seal for abutting said oil filter unit and for sealingly engaging said filter unit to preclude the escape of oil contained therein;

attachment means characterizing the lower surface of said plate and axially aligned with the aforesaid threads of said oil filter unit; and the threads of said oil filter unit and the said attachment means of said cap being appropriately dimensioned to cause seating of said cap on said oil filter unit to seal same while securely locking said cap to the filter unit itself.

2. The combination of claim 1, wherein said oil filter unit is characterized by raised sealing means disposed exteriorly on said first end thereof for abuttingly receiving the sealing surface of said flat plate.

3. The combination of claim 1, wherein said means for facilitating force thereon for inducing manual rotation of said cap is characterized by a plurality of raised cross ridge means.

4. The combination of claim 1 wherein a gasket means is affixed to the surface of said oil filter unit on which the throw away protective cap is adapted to rest so as to preclude leakage therefrom.

* * * * *